Sept. 1, 1936. J. E. NORMAN 2,052,645
VEHICLE
Filed April 30, 1936 2 Sheets-Sheet 1
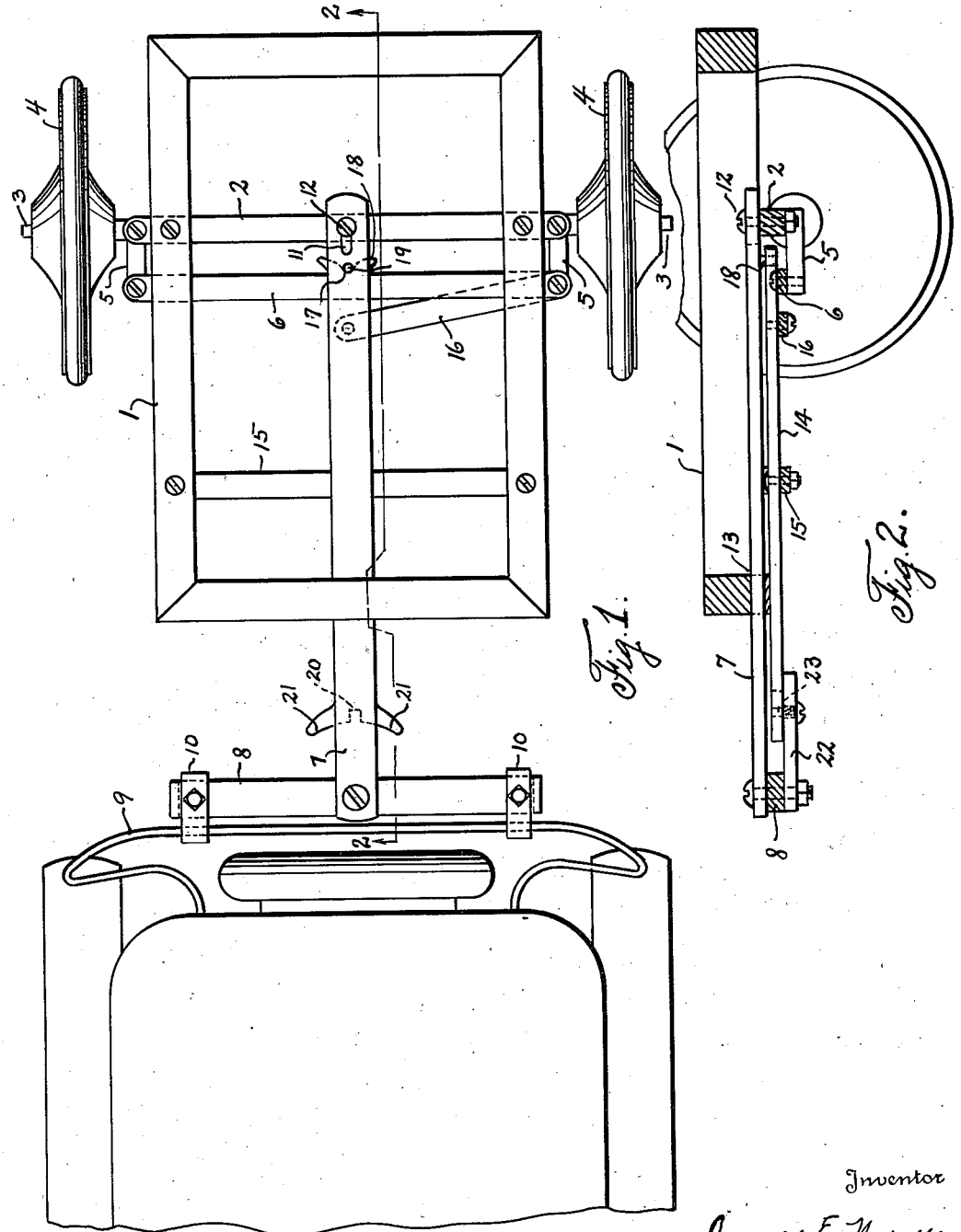
Inventor
James E. Norman
By Hardway Cathey
Attorneys Sept. 1, 1936.   J. E. NORMAN   2,052,645
VEHICLE
Filed April 30, 1936   2 Sheets-Sheet 2

Inventor
James E. Norman
By
Hardwy Cathy
Attorneys

Patented Sept. 1, 1936

2,052,645

UNITED STATES PATENT OFFICE 2,052,645

VEHICLE

James E. Norman, Donna, Tex.

Application April 30, 1936, Serial No. 77,176

6 Claims. (Cl. 280—33.55)

This invention relates to a vehicle and has particular relation to a trailer steering apparatus.

An object of the invention is to provide means for connecting a trailer to a draft vehicle, said connecting means also including means for controlling the movements of the trailer.

A prime object of the invention is to provide a trailer hitch and steering device by the use of which the trailer may be steered rearwardly in the same direction as the rearward movement of the draft vehicle.

The invention comprehends a steering mechanism which is operative to control the steering of the trailer wheels upon rearward movement of the trailer but which is automatically locked upon forward movement of the draft vehicle and trailer.

It is a further object of the invention to provide a trailer hitch and steering mechanism which is of very simple construction, which is positive and accurate in operation, which is automatically actuated into active and inactive positions and which may be cheaply constructed and readily installed and repaired.

With the above and other objects in view the invention has particular relation to certain novel features of construction, operation and arrangement of parts, an example of which is given in this specification and illustrated in the accompanying drawings, wherein:—

Figure 1 shows a plan view of a trailer equipped with the hitch and steering mechanism and shown connected to a draft vehicle.

Figure 2 shows a longitudinal sectional view of the trailer taken on the line 2—2 of Figure 1.

Figure 3:
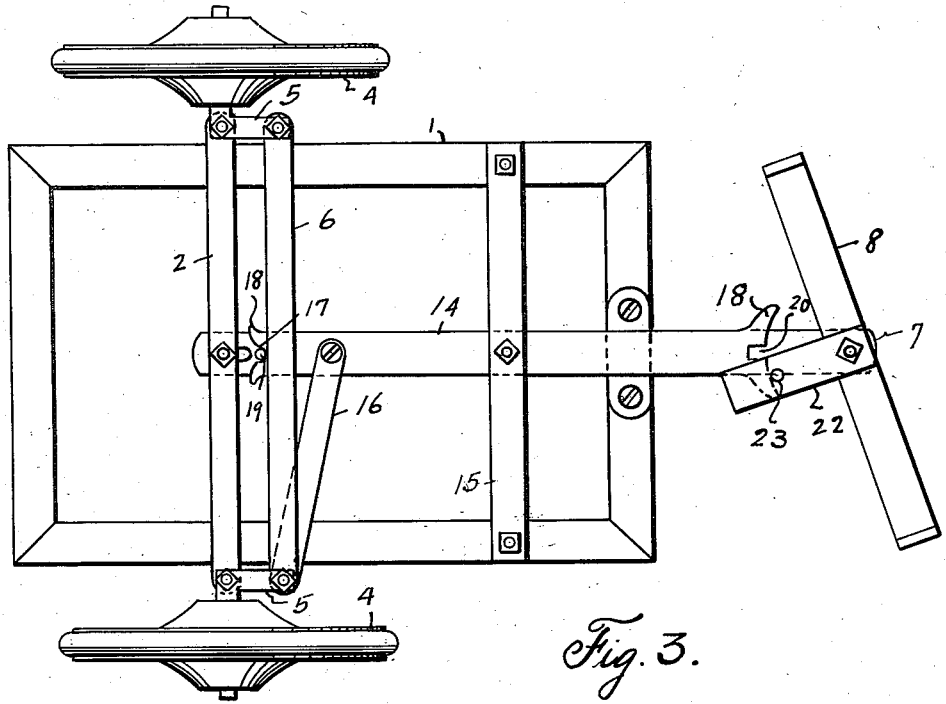
Figure 3 shows a bottom plan view of the trailer showing the steering mechanism locked or in inactive position.
Figure 4:
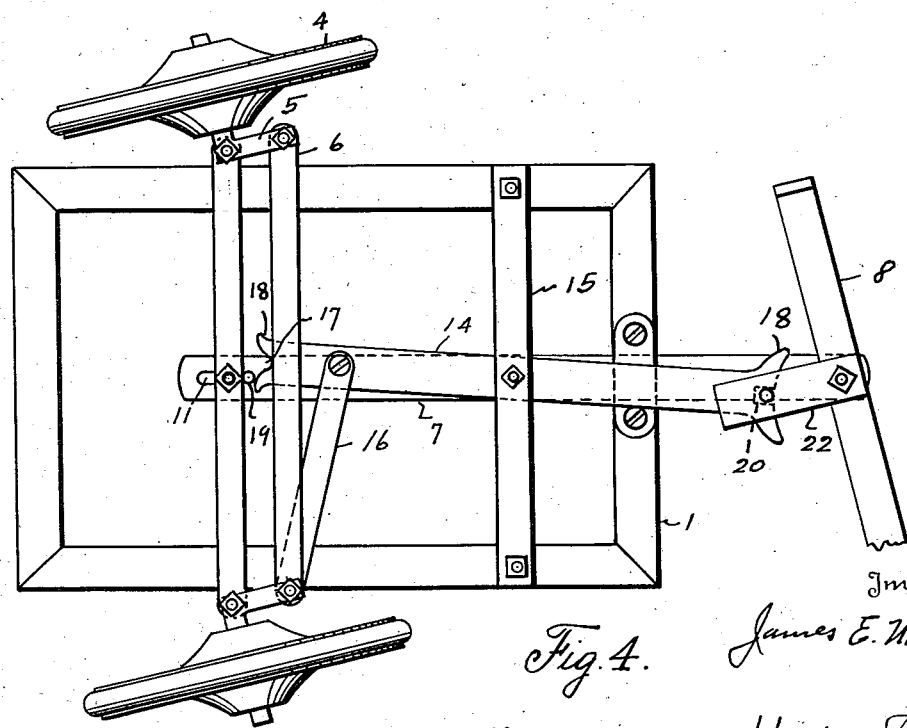
Figure 4 shows a bottom plan view showing the steering mechanism unlocked, or in active position.

Referring now more particularly to the drawings, wherein like numerals of reference designate similar parts in each of the figures, the numeral 1 designates the trailer framework which may be of any selected construction and which is mounted in any preferred manner on the axle 2. Pivotally connected to the ends of the axle to swing on vertical axes are the wheel spindles 3, 3 on which the trailer wheels 4, 4 are mounted to rotate. The wheel spindles have the forwardly extended steering arms 5, 5 rigidly connected thereto. A transverse tie rod 6 has its ends pivotally connected to the forward ends of the arms 5. There is a draft bar 7 whose forward end is pivotally connected to the draft yoke 8, which in turn may be connected in any suitable manner to the rear end of the draft vehicle. As shown, the yoke is clamped to the rear bumper 9 by the end clamps 10, 10. This draft bar 7 is mounted for limited longitudinal movement relative to the trailer frame 1. As shown its rear end is provided with a longitudinal slot 11 and a suitable retaining means is provided for controlling and limiting the range of movement of the draft bar. As shown a bolt 12 is fitted through the slot 11 and through the axle 2 or other suitable part of the framework, said bolt having the usual retaining head thereon. A bearing 13 is provided on the framework 1 through which the draft bar 7 works and which confines it to a longitudinal movement relative to the trailer framework 1. Included in the trailer steering mechanism there is a steering bar 14 which is preferably arranged underneath the draft bar 7. The steering bar is mounted to pivot on a vertical axis on the transverse frame member 15 forming a part of the general framework 1. A steering link 16 is pivotally connected at one end to the forward end of one of the steering arms 5 and is pivotally connected at its other end to the steering bar 14, the required distance in front of the rear end thereof. The rear end of the steering bar 14 is provided with a notch 17 and with the rearwardly flared guides 18 and depending from the steering bar 7 there is a stud 19 adapted to cooperate with said notch in a manner hereinafter explained. The forward end of the steering bar 14 is also provided with a notch 20 and has the forwardly flared guides 21, 21.

Rigidly anchored to the draft yoke 8 and extending rearwardly therefrom there is a steering arm 22 having the upwardly extended stud 23 adapted to cooperate with the notch 20 as hereinafter explained.

Upon forward movement of the draft vehicle the draft bar 7 is in its forward position, the rear end of the slot 11 engaging the bolt 12 and the stud 19, having been guided by the guides 18 into the notch 17 and engaging the rear end of the draft bar 7. The stud 23 will move forwardly with the draft yoke 8, thus unseating the stud from the notch 20, allowing free pivotal movement of the draft yoke without affecting the movement of the steering bar 14, said steering bar being at this time locked against movement by the stud 19. The steering mechanism of the trailer wheels will be thereby locked or inactive so that the trailer will readily follow the forward course of the draft vehicle ahead in the usual way.

If it be desired to back up or move the draft vehicle rearwardly, it is desirable also that the trailer be steered in the intended rearward path of the draft vehicle. This is not possible with the trailer hitch mechanisms now in common use. Upon rearward movement of the draft vehicle the stud 23 will be guided into and seated in the notch 20 and the draft bar 7 will be moved rearwardly, unseating the stud 19 from the notch 17. This will unlock the trailer steering mechanism. The steering bar 14 is now in operative connection with the draft yoke 8 and is responsive to the movements of the draft vehicle. Upon rearward movement of the draft vehicle, as its course is changed, the steering bar 14 will operate to correspondingly guide the trailer wheels 4 in the desired direction to the end that the trailer will be guided along the intended course to be followed by the draft vehicle during its movement.

The drawings and description disclose what is now considered to be a preferred form of the invention by way of illustration only, while the broad principle of the invention will be defined by the appended claims.

What I claim is:

1. A trailer hitch and steering apparatus comprising a draft bar, means for connecting the forward end of the bar to a draft vehicle, means movable transversely of the vehicle and connected to and adapted to guide the trailer wheels, means for locking the guide means in inactive position upon forward movement of the draft vehicle and for releasing the guide means upon rearward movement of the draft vehicle.

2. A trailer hitch and steering apparatus comprising a draft bar, means for connecting the forward end of the bar to a draft vehicle, means movable transversely of the vehicle and connected to and adapted to guide the trailer wheels, means for locking the guide means in inactive position upon forward movement of the draft vehicle and for releasing the guide means upon rearward movement of the draft vehicle, and means for controlling the movements of the guide means in accordance with the rearward movements of the draft vehicle.

3. A trailer hitch, a steering apparatus comprising a longitudinally shiftable draft member mounted on the trailer frame, means for connecting said member to a draft vehicle, means on the trailer connected to, and adapted to guide, the trailer wheels, means for locking the guide means in inactive position upon forward movement of the draft vehicle and draft member and for releasing the guide means upon rearward movement of the draft vehicle and draft member.

4. A trailer hitch, a steering apparatus comprising a longitudinally shiftable draft member mounted on the trailer frame, means for connecting said member to a draft vehicle, means on the trailer connected to, and adapted to guide, the trailer wheels, means for locking the guide means in inactive position upon forward movement of the draft vehicle and draft member and for releasing the guide means upon rearward movement of the draft vehicle and draft member and means operative upon rearward movement of the vehicle and effective to actuate the guide means to steer the trailer wheels in harmony with the rearward movement of the draft vehicle.

5. A trailer hitch and steering apparatus comprising a draft bar, means for connecting the forward end of the bar to a draft vehicle, means for connecting said bar to a trailer to allow a limited longitudinal movement of the bar relative to the trailer, means on the trailer connected to, and adapted to guide the trailer wheels, means on the bar for locking the guide means in inactive position upon forward movement of the draft vehicle and for releasing the guide means upon rearward movement of the draft vehicle and means operative upon such rearward movement to effect the steering movements of the trailer wheels in accordance with variations in the rearward movement of the draft vehicle.

6. A trailer hitch and steering apparatus for steering a trailer having wheel spindles mounted to pivot on vertical axes and comprising a longitudinally shiftable draft bar mounted on the trailer frame, means for connecting said bar to a draft vehicle, a transversely shiftable tie rod connected to the wheel spindles, a pivotally mounted steering bar, a link for connecting the steering bar with one of the wheel spindles, means for locking the steering bar in inactive position upon forward movement of the draft vehicle and for releasing the steering bar for pivotal movement upon rearward movement of the draft vehicle and means operatively connecting said connecting means with the steering bar, when the latter is released, whereby the wheel steering mechanism will be actuated, upon rearward movement of the draft vehicle, to guide the steering wheels of the trailer in accordance with the rearward movements of the draft vehicle.

JAMES E. NORMAN.